Jan. 13, 1931.  J. SCHÜNEMANN  1,788,849
RADIANT READING PYROMETER
Filed Dec. 16, 1927
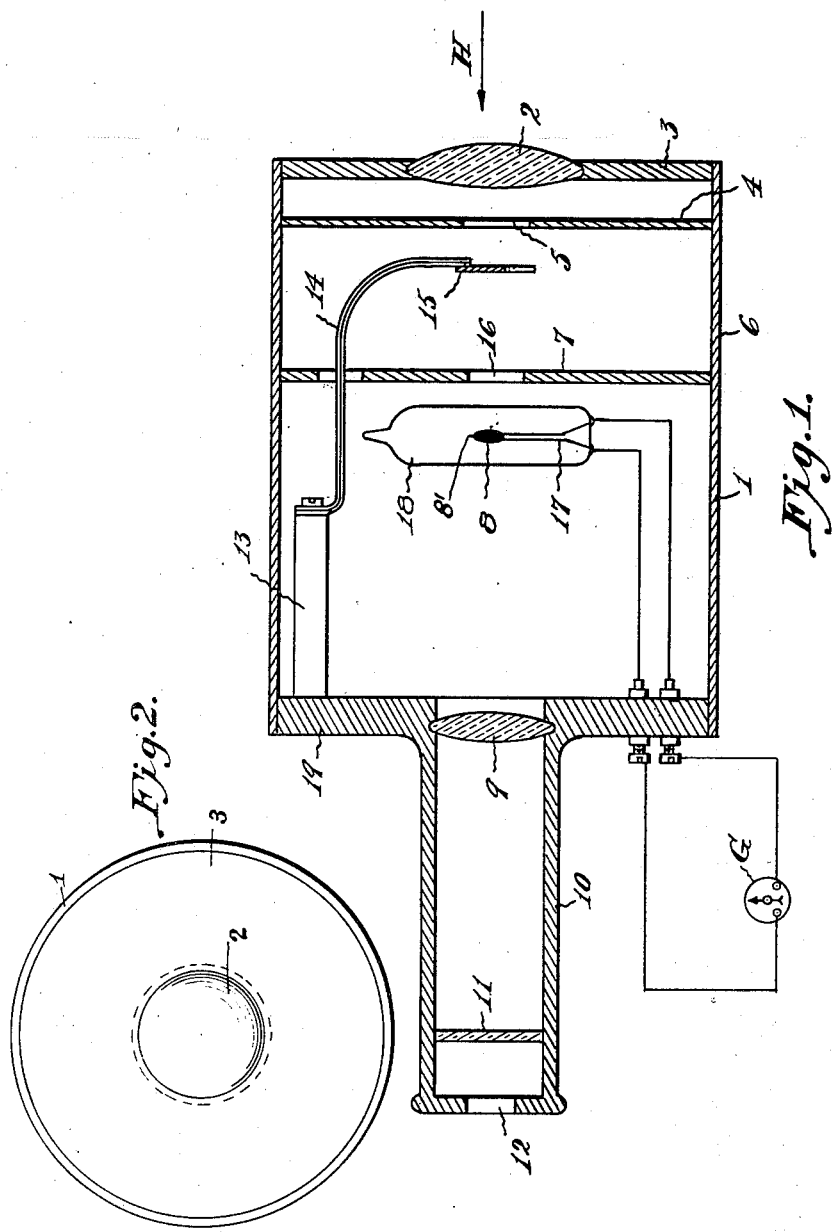
INVENTOR
Julius Schünemann,
BY
Harold D. Penner
ATTORNEY Patented Jan. 13, 1931

1,788,849

UNITED STATES PATENT OFFICE

JULIUS SCHÜNEMANN, OF BAD HOMBURG, GERMANY, ASSIGNOR TO HARTMANN & BRAUN AKTIENGESELLSCHAFT, OF FRANKFORT-ON-THE-MAIN, WEST, GERMANY, A CORPORATION OF GERMANY

RADIANT READING PYROMETER

Application filed December 16, 1927, Serial No. 240,606, and in Germany December 24, 1926.

This invention relates to temperature measuring devices and more specially to radiation pyrometers though it is noted that the invention is not limited to radiation pyrometery nor in some respects even to measuring devices.

In order to prolong the life of a temperature measuring instrument in high temperature work, it is general practice at present to use a device which measures at a distance the radiations from a heated object. This is due to the fact that the thermal energy radiated from a heated body is predicated upon its temperature only.

With the aid of an optical system the rays of light coming from a body can be collected and focused on a blackened body, usually a blackened lamina at the junction of a thermo-electric couple. The lamina becomes heated and its temperature rise is measured by a galvanometer associated with it. Thus, the temperature of the heated body is indirectly measured.

One disadvantage of the radiation pyrometers described above is that they measure the temperature of their surroundings as well as that of the heated body. I have by theoretical considerations discovered that the error due to the surroundings may be corrected and in fact eliminated. By the provision of compensating means disclosed by me hereinafter, I have been enabled to obtain results which are independent of the temperature of the pyrometer surroundings.

One of the principal objects of my invention then is to eliminate the influence of the temperature of its surroundings on a radiation pyrometer when the pyrometer is being used to measure the temperature of a heat radiating body.

Another object of my invention is to provide means associated with a radiation pyrometer whereby the error due to the influence of its surroundings upon the pyrometer thermo-electric couple is corrected.

Other objects of the invention are to improve generally the simplicity and efficiency of such devices and to provide a device or apparatus of this kind which is economical, durable and reliable in operation, and economical to manufacture.

Still other objects of the invention will appear as the description proceeds and while herein details of the invention are described and claimed, the invention is not limited to these, since many and various changes may be made without departing from the scope of the invention as claimed in the broader claims.

In the drawing, Fig. 1 shows a pyrometer, partly in section, embodying the invention shown diagrammatically, Fig. 2 shows an end view, reduced, of the pyrometer.

As shown in Fig. 1 of the drawing, I have embodied my surroundings temperature compensating means in a radiation pyrometer of the type shown generally as comprising a cylindrical casing 1. An objective lens 2 disposed as shown in a disk-like end 3 collects the rays coming from an incandescent body H in the direction of the arrow. The rays are projected through an aperture 5 in a blackened partition 4 disposed between the walls 6 of the pyrometer. The rays then pass through an aperture 16 in another partition 7 also disposed between walls 6. After being further concentrated in the eye-piece lens 9 disposed in the eye-piece 10, the rays fall on the frosted glass disk 11, and form thereon an image of the incandescent body capable of being perceived through the aperture 12.

The rays have also been thrown upon the junction 8 of a thermo-electric couple 17 enclosed in an evacuated bulb 18. The junction 8 is provided with a blackened lamina 8' as shown in the drawing. The black coating 8' may be of any conventional type well known to those skilled in the art of pyrometry. The result is that the energy of the radiated rays is converted into heat. The blackened lamina 8 becomes heated and the consequent rise in its temperature thus produced is measured by a properly calibrated galvanometer G connected as shown to the couple 17. Thus indirectly the temperature of the incandescent body is ascertained.

In order for the indications of the instrument to be independent of the distance from the incandescent body it is only necessary for the image of the body to be larger than the area of the blackened lamina so that the latter is entirely covered up.

Provision is made for adjusting the pyrometer into such position in the following manner:—

The lens 9 throws an image of the thermo-electric couple and the lamina upon the frosted disk 11. As stated above, the lenses 2 and 9 throw an image of the incandescent body on the disk. It is absolutely necessary for accurate temperature indication that the image of the lamina on the disk 11 as seen thru 12 should be completely covered up by the image of the incandescent body. Of course, the instrument 1 is portable so that it may be moved to such a distance from the body being measured as will satisfy the stated conditions.

To eliminate the error due to the temperature of the surroundings of the pyrometer, I provide means whereby the energy radiated from the incandescent body upon the blackened lamina is varied in accordance with the change in temperature of the said surroundings. A column 13 attached, as shown, to the wall 19 supports a bi-metallic strip 14.

The unattached end of strip 14 carries a diaphragm 15 which controls the quantity of rays passing into the aperture 16. The bi-metallic strip 14 consists of two dis-similar metals, as brass and zinc, curved, as shown in Fig. 1. In case of a temperature change in the pyrometer surroundings, the strip will be deflected upwards or downwards.

This deflection will move the diaphragm 15 either up or down. Thus, a compensating action is secured. The amount of thermal energy contained in the rays passing diaphragm 15 being a constant, changes in the temperature of the pyrometer surroundings, will affect the position of the diaphragm relative to the rays so that a greater or lesser quantity of rays impinge on the lamina 8'. In other words, the diaphragm is adjusted to compensating position automatically by the aid of an element responsive to changes of temperature in the surroundings of the pyrometer.

The use and operation of the device is believed self-explanatory. The pyrometer is held in a horizontal position as if one were looking through a telescope, and placed at proper temperature reading distance from the heated body, as heretofore explained; readings being taken from the galvanometer G. Assuming that an increase in the temperature of the pyrometer surroundings deflects the bi-metallic strip 14 downwards, then the effect of this increase of surroundings temperature on the lamina 8' would be compensated for by movement of the diaphragm 15 downwards, thereby cutting off some of the rays passing through the aperture 16.

Thus, although the temperature of the lamina 8' has been increased due to the added heat of the pyrometer surroundings, yet due to the cutting off of some of the radiation from the incandescent body the total effect on the lamina 8' is the same as it was before the heat change in the surroundings of the pyrometer.

What I claim is:

1. In a pyrometer, means for collecting rays coming from an incandescent body, a thermo-electric couple in optical alinement with said collecting means, a blackened lamina at the junction of said couple and adapted to be heated by the heat of the collected rays, means adjacent said couple movably responsive to changes in temperature of the pyrometer surroundings, and means mounted on said movable means and adapted, when moved in one direction, to cut off a quantity of rays falling on said lamina.

2. A radiation pyrometer including in combination, means responsive to the radiation from an incandescent body, means automatically responsive to temperature changes in the pyrometer surroundings; means on said temperatures responsive means operating to control, when moved in one direction, the amount of radiation received by said first mentioned means, whereby the effect of the said surroundings temperature on said first mentioned means is compensated for.

3. A radiation pyrometer comprising a thermo element responsive to radiations from an incandescent body, a bimetallic strip near said thermo element responsive to heat changes in the pyrometer surroundings, and a diaphragm mounted for movement with said strip and disposed between said element and the body.

4. A radiation pyrometer including in combination an optical system, a casing enclosing and supporting said system, a thermo-couple mounted within said casing in the axis of said system, a bimetallic strip in said casing, and a diaphragm secured to one end of said strip and disposed in the axis of said system.

5. In a radiation pyrometer the combination with an optical system of a thermo-couple including a blackened lamina in the axis of said system, and a diaphragm between said lamina and the source of radiation, and temperature-responsive means to automatically move said diaphragm.

6. In a pyrometer, the combination with a casing, of an eyepiece arranged at one end of the casing, a thermo-electric couple including a blackened lamina at the junction of said couple, in said casing, said lamina being disposed in the optical axis of said eyepiece, a partition in said casing provided with a pair of apertures, one of said apertures being in alinement with said lamina, a second, blackened partition in said casing provided with an aperture in alinement with said lamina, said couple being disposed between said eyepiece and said first partition, a bi-metallic member, affixed at one end to said casing, and having its free end disposed between said two partitions, said member passing through the other aperture in said first partition, a shutter affixed to the free end of said member and being disposed between said lamina and the aperture in said second partition, an objective lens in a wall of said casing in alinement with said lamina, said eyepiece including a frosted glass disk to receive an image of said lamina.

7. The combination with a casing, of an eyepiece arranged at one end of the casing, a thermo-electric couple, including a blackened lamina, in said casing, said lamina being disposed in the optical axis of said eyepiece, a blackened partition in said casing provided with an aperture in alinement with said lamina, said couple being disposed between said eyepiece and said partition, a bi-metallic member, affixed at one end to said casing, and having its free end disposed adjacent said aperture, a shutter affixed to the free end of said member and being disposed between said lamina and the said aperture in said partition, an objective lens in a wall of said casing in alinement with said lamina.

8. A radiation pyrometer, comprising, a casing, an eyepiece arranged at one end of the casing, a radiation responsive means including a blackened lamina, in said casing, said lamina being disposed in the optical axis of said eyepiece, a blackened partition in said casing provided with an aperture in alinement with said lamina, said means being disposed between said eyepiece and said partition, a temperature responsive member, affixed to said casing, and having a free end adjacent said aperture, a diaphragm, affixed to the free end of said member, and being disposed between said lamina and the aperture in said partition, and an objective lens in a wall of said casing in alinement with said aperture.

9. In a radiation pyrometer, the combination with a casing, of an eyepiece arranged at one end of the casing, a thermo-electric couple, including a blackened lamina at the junction of said couple, in said casing, said lamina being disposed in the optical axis of said eyepiece, a partition in said casing provided with a pair of apertures, only one of said apertures being in alinement with said lamina, a second, blackened partition in said casing provided with an aperture in alinement with said lamina, said couple being disposed between said eyepiece and said first partition, a bi-metallic member affixed at one end to said casing and partly disposed between said two partitions, said member passing through the other aperture in said first partition, a shutter affixed to the free end of said member and being disposed between said lamina and the aperture in said second partition an objective lens in a wall of said casing in alinement with said lamina, said eyepiece including a lens and a frosted glass disk to receive an image of said lamina, said disk being in alinement with said eyepiece lens, lamina, objective lens, and shutter.

10. In combination, a housing having a partition dividing the housing into pyrometer and diaphragm chambers, the partition and a wall of the diaphragm having alined openings therein; a light sensitive element in the pyrometer chamber in line with said openings; a bi-metallic element having its inner end mounted in the pyrometer chamber and its free portion extending into the diaphragm chamber; and a diaphragm on the free end in part between said openings.

Signed at Frankfort-on-the-Main, Germany, in the Province of Hesse-Nassau, and State of Prussia, this 5th day of December, A. D. 1927.

JULIUS SCHÜNEMANN.